United States Patent [19]

Holly

[11] 3,953,128

[45] Apr. 27, 1976

[54] PROCESS AND APPARATUS FOR FILAMENT OR SLIT SIZE MONITORING

[75] Inventor: Sandor Holly, Falls Church, Va.

[73] Assignee: Atlantic Research Corporation, Alexandria, Va.

[22] Filed: Jan. 6, 1975

[21] Appl. No.: 539,198

Related U.S. Application Data

[63] Continuation-in-part of Ser. No. 451,332, March 25, 1974, abandoned.

[52] U.S. Cl............................ 356/106 R; 356/159; 356/171
[51] Int. Cl.² ........................................ G01B 11/10
[58] Field of Search .............. 356/102, 106 R, 113, 356/159, 169–171

[56] References Cited
UNITED STATES PATENTS

| | | | |
|---|---|---|---|
| 3,141,057 | 7/1964 | Acton | 356/159 |
| 3,680,961 | 8/1972 | Rudd | 356/102 |
| 3,830,568 | 8/1974 | Allen | 356/102 X |

OTHER PUBLICATIONS

Farmer, "Observation of Large Particles...", Applied Optics, Vol. 13, No. 3, pp. 610–622, 3/13/74.
Farmer, "Measurement of Particle Size...", Applied Optics, Vol. 11, No. 11, pp. 2603–2612, Nov. 1972.
Farmer et al., "Two-Component, Self-Aligning...", Applied Optics, Vol. 12, No. 11, pp. 2636–2640, Nov. 1973.

Primary Examiner—John K. Corbin
Assistant Examiner—Matthew W. Koren
Attorney, Agent, or Firm—Martha L. Ross

[57] ABSTRACT

Method and apparatus for determining the width of an elongated element, such as a filament or slit which comprise producing a moving interference fringe zone by converging two beams of coherent light of the same intensity but slightly different frequency; positioning the element within the fringe zone in such manner that the longitudinal axis of the element is substantially normal to the plane of the convergent beams, namely, parallel to the plane of the fringes; maintaining the element substantially spatially stationary relative to the zone, whereby the moving fringe pattern continuously sweeps across the element; and determining the ratio of the AC to DC signal components of the radiation scattered or transmitted by the element. The method and system include respectively the step and means therefor of adjusting or scanning the fringe period value around the element to determine the size capable of producing a minimum AC/DC ratio. In the case of a system substantially free from noise, including non-compensating optical noise factors introduced by the element being measured, a zero ratio indicates that the filament diameter or slit width equals the known fringe period, and a non-zero ratio indicates diameter or slit width deviation from the fringe period, the degree of which can be determined from the signal ratio with the use of known means by adjusting the fringe period until the AC component of the signal becomes zero. In the case of a system having a substantial amount of noise, the AC/DC minimum ratio obtained at a given fringe period may have a finite value and indicates an element width equal to the given fringe period times a constant, the constant being the ratio of the width of the given element and the given fringe period. The element, though spatially stationary in the fringe zone, can be continuously moving longitudinally. The process and system are particularly useful for monitoring the width of manufactured elements and, by automatic feedback, correcting deviations. In some applications where change in the magnitude of the DC signal component during the fringe period scan is sufficiently nominal with respect to permissible width-sensing error, the AC/DC ratio measurement can be dispensed with and determination of the AC signal component minimum alone can be employed.

160 Claims, 8 Drawing Figures

PROCESS AND APPARATUS FOR FILAMENT OR SLIT SIZE MONITORING

RELATED APPLICATIONS

This application is a continuation-in-part of patent application Ser. No. 451,332, filed 25 Mar. 1974, now abandoned.

BACKGROUND OF THE INVENTION

There has long been a need for rapidly and accurately measuring the diameter of thin filaments, which may be of predetermined lengths or in continuous form, such as wires, threads, rods, strands, and the like, either solid or hollow, without actual physical contact, for such purposes as quality control and control of the manufacturing process. For reasons of simplicity, the following discussion will be primarily in terms of filaments, although it is also applicable to slits. Demand has also increased for rapid and accurate measurement of the width of narrow slits in a number of applications, as for example in optical masks such as used in microelectronics technology. It will also be understood that for reasons of convenience the term "elongated element" is employed in the specification and the claims to define slit or filament, and the term "width of the elongated element" is employed to define slit width or filament diameter.

Various optical systems have been proposed, particularly diffraction techniques wherein the filament is positioned within a beam of coherent light and forms a diffraction pattern which is detected and measured in various ways. Such techniques have not proved altogether satisfactory because of such factors as varying light intensities across the diffracted image, differences caused by the reflectivity or refractivity of the material, the need for simultaneously employing comparative standards, complexity of the apparatus, and the like.

Laser Doppler velocimeters (LDV) have recently been developed for determining the rate of fluid flow in wind and water tunnels by suspending small particles in the fluid and determining their velocity and size by means of the velocimeter. Such velocimeters generally comprise convergent laser beams of equal size, intensity, and frequency which produce a stationary interference fringe pattern within the zone of convergence, sometimes called the probe volume. The interference fringes are planes which are normal to the plane defined by the center lines of the two converging laser beams and parallel to the bisector of the converging beams. Light intensity and, therefore, scatter intensity and signal magnitude, are greatest at the geometric center of the fringe zone. In operation, the apparatus is set up so that the fluid-borne particles move across the fringes in a plane normal to the fringe planes, thus crossing the fringe zone from the peripheral region of least intensity through the center region of maximum intensity, and then through the region of decreasing intensity. For optimum signal and resolution, the scattered-light collecting optics must be focused at or near the geometric center of the probe volume and, because of the rapid movement of the particle across it, the scattered radiation due to the particle generally consists of only a short burst in the order of microseconds, with consequent difficulty in resolution. Such a system is also greatly subject to constraint due to fringe intensity contrast variations. For these and other reasons, such systems have been considered to be most accurate in the measurement of particles which are much smaller than the fringe spacing since illumination of the smaller particles is more uniform despite the fact that the art recognized that size can be estimated when the fringe spacing is comparable to a particle diameter. Such laser Doppler velocimeters are described in detail in the article by W. M. Farmer, "Measurement of Particle Size, Number Density, and Velocity Using a Laser interferometer," Applied Optics, Vol. 11, No. 11, Nov. 1972, pp. 2603–2612, and G. J. Rudd, U.S. Pat. No. 3,680,961.

In more recent development of the Laser Doppler Velocimeter, the art discloses the use of probe volumes in which the fringes are caused to move continuously in a direction normal to the fringe planes by employing converging laser beams of the same intensity but slightly different frequency, e.g., a frequency difference, within the radio frequency band. Such shifting of the frequency of one of the beams can, for example, be produced by diffraction of an incident laser beam by means of an ultrasonic Bragg cell, which can be made to divide the incident beam into two diverging beam components of the same intensity, one nondiffracted component having the incident beam frequency and the other diffracted component with its wavelength shifted by an amount equal to the Bragg cell frequency. The difference in frequency between the two existing beams ($\Delta f$) is within the radio frequency band. Since the two coherent light beams which leave the Bragg cell are diverging, it is required that the beams be converged by an appropriate optical system to form the desired interference, fringe pattern. The moving fringe pattern moves at a rate equal to $\Delta f$, which in turn is equal to the Bragg cell frequency.

The moving fringe technique has been applied to the LDV primarily to provide a means for determining the direction of movement of the particles moving across the fringe planes. It provides no improvement in determination of particle size. The application of single and two-dimensional Bragg cell systems to the LVD is disclosed in Chu et al, "Bragg Diffraction of Light by Two Orthogonal Ultrasonic Waves in Water," Appl. Phys. Lett., Vol. 22, No. 11, 1 June 1973, pp. 557–59; and W. M. Farmer et al, "Two-Component, Self-Aligning Laser Vector Velocimeter," Applied Optics, Vol. 12, No. 11, Nov. 1973, pp. 2636–2640. In connection with the above-described prior art, it should also be noted that a static or stationary particle in a stationary fringe zone cannot be size-measured.

None of the available art recognizes or discloses the present invention or its principles of operation, namely, the accurate determination of the diameter of a filament by placing it within a moving interference fringe zone, maintaining it substantially stationary parallel to the plane of the fringes and normal to the plane of the convergent laser beams. The moving fringes are provided for the purpose of measuring the size, namely diameter of the filament, and not for the prior art purpose of more accurately determining the velocity of particles. Additionally, the present invention makes possible stationary positioning of the filament geometrically in the regime of optimum intensity for an indefinite length of time, thereby providing continuous optimum signal visibility and resolution and making possible continuous accurate measurement of filament diameters equivalent to the width of the fringe spacing (fringe period), or, in the case of substantial noise components in the system, to the size of the fringe period producing the minimum AC/DC ratio times a constant. The present invention makes possible the use of known fringe spacings (which can be calculated or otherwise determined by conventional art techniques) to determine the width of an elongated element and to monitor continuously the width of an elongated element and, thereby, detecting deviations from preset values. Where the observed scattered light signal shows filament diameter deviation (namely, where the AC/DC ratio does not equal zero or, in the presence of noise factors, a predetermined minimum which may be other than zero), the fringe period can be adjusted until the ratio equals zero or said minimum, thereby determining the accurate filament diameter, or the deviation of diameter from fringe period can, by appropriate conventional electronics, be translated into an error voltage which can be employed either in a simple display showing filament diameter deviation or as a feedback means for regulating the filament production process to bring the filament to the desired diameter as determined by the setting of the fringe period.

The present method of measuring filament diameter by nulling (or minimizing) the AC signal has additional advantages including but not limited to the following. Accuracy of measurement is independent of intensity fluctuation of the laser source. Accuracy is not affected or compromised by the reflectivity or refractivity of the filament. Accuracy does not depend on the calibration accuracy of the signal detector devices or the distortions or non-linearities of components of the optical system, either per se or in terms of sensitivity to changing environment conditions. Thus, the system and components can be relatively low cost and can be used in uncontrolled environments, such as manufacturing facilities.

The process and apparatus can, of course, be employed for such scientific purposes as a laboratory gauge for fine filaments. They have particular practical utility for monitoring the diameter or gauge of thin filaments produced in commercial manufacturing processes continuously and without damaging contact. It will be understood that in this specification and in the claims the term "filament" includes monofilaments, such as fibers, wire, thread, and multifilaments, such as strands, yarns, and the like, which can be of a predetermined length for a given application or continuous, such as spool-wound strands, and may be solid or hollow, e.g., tubular. The term also includes filaments of any cross-sectional geometry, e.g., circular, elliptical, rectangular, star-shaped, and the like.

SUMMARY OF THE INVENTION

The invention comprises a process (and apparatus therefor) for measuring widths of elongated elements, such as filament diameters or slit widths by providing a laser source; dividing the coherent laser beam into two coherent beams of equal size and intensity which differ in frequency, the difference being within the radio frequency band; converging the two beams to form within the volume of convergence an interference fringe pattern zone; positioning the filament within the zone in such manner that the longitudinal axis of the filament is substantially normal to the plane defined by the converging laser beams (parallel to the fringe planes); maintaining the filament substantially spatially stationary relative to the fringe, although the filament may be moving longitudinally along its axis within the defined position zone, so that the moving fringe pattern continuously sweeps across the filament transversely; collecting radiation scattered by the filament; and determining, by suitable conventional equipment, the ratio of the AC to DC radiation components. The spacing between the fringes or fringe period is a known quantity since it can be determined by conventional techniques from such factors as laser wavelength and angle of convergence of the beams. A zero AC signal component obtained from the radiation, scattered by the filament, nulls the AC/DC value and indicates that the diameter of the filament is equal to the fringe period which can be set for the desired diameter of the filament. In other words, the ratio of the diameter of the filament D (or width of the elongated element) to the fringe period $\lambda_s$ equals a constant of one ($k = 1$) at an AC/DC ratio of zero. Such a ratio signal can also be obtained when the filament diameter equals a whole integer multiple of the fringe period, and a method for distinguishing such multiples will subsequently be discussed. In the case of slits, the AC and DC components measurements are obtained from the radiation transmitted through the slit.

When the diameter of the filament deviates from the desired nulling diameter, the AC/DC ratio will not be zero and the actual diameter can be determined from the size and sign of the AC/DC ratio by known techniques. Since this mode of measurement can introduce additional computations and some comparative uncertainties, it is generally preferred to determine the deviation of filament diameter by adjustment of the system to produce a fringe period which results in a new nullity of the AC/DC ratio. This can be accomplished in various ways as, for example, by changing the input laser wavelength. Generally, it is most easily accomplished by adjusting the convergent angle of the beams.

The non-zero AC signal showing deviation of the filament diameter from the desired diameter can be fed back to the manufacturing process for automatic filament diameter control by such means as employing a ratio meter which can generate an error voltage which is proportional to the diameter variation. The filament diameter deviation can also be determined by the increase or decrease in the spacing of the fringe period required to bring the AC/DC signal ratio to zero as aforedescribed. The thus determined deviation can then be transformed into an error signal which can be fed back into automatic filament diameter controls in the manufacturing process by electronic means known to the art.

The above-described filament diameter-measuring method or said method modified, as described below, for noise factors, gives accurate diameter values for filaments with circular cylindrical geometry. The invention is also applicable to measure an equivalent (average) diameter of filaments of different cross-sectional geometry.

It should also be noted that the small amount of lateral movement which may occur with a flexible filament results in no appreciable error.

DRAWINGS

FIG. 1A is an enlarged diagrammatic illustration showing the crossover of the converging coherent light beams and resulting moving interference fringe zone shown in FIG. 1.

DETAILED DESCRIPTION

Figure 1:
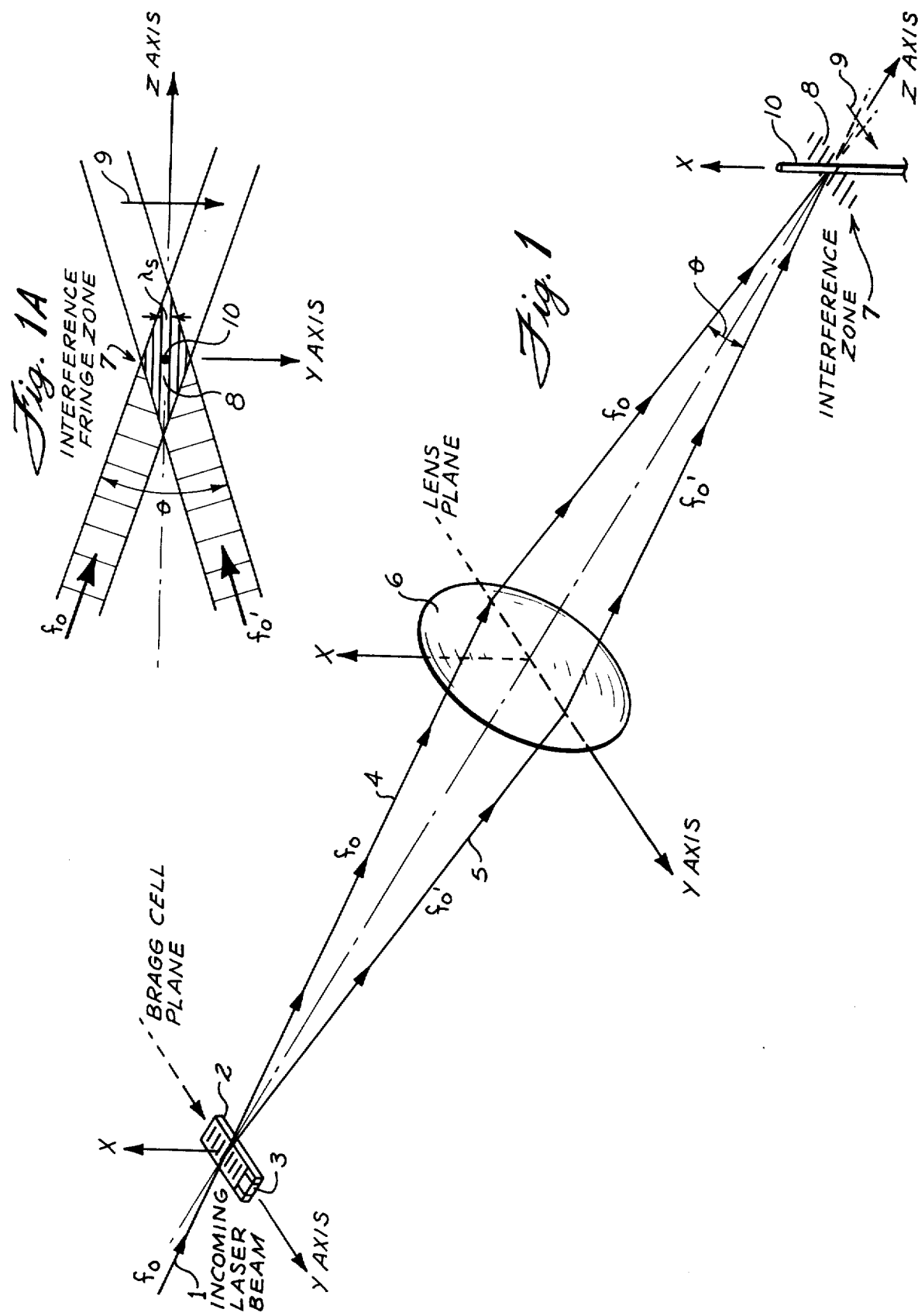
FIG. 1 is a diagrammatic illustration showing one embodiment of an optical system for implementing the filament diameter monitoring system of the invention and the coherent light beam paths and relationships.

In FIG. 1, laser beam 1 of frequency $f_o$ enters at a slight angle, diffraction Bragg cell 2 which consists of an acoustic medium and is compressionally driven by crystal transducer 3 at an imposed oscillation frequency, e.g., 10 to 100 Mc, to form acoustic wavelengths $\lambda_a$ in the cell medium. The input laser beam is divided by the Bragg cell into two coherent light beams of equal intensity, one beam 4 being non-diffracted and having the original $f_o$ frequency, and the other beam 5 being diffracted and acoustically modified into slightly shifted frequency $f_{o1}$. The difference in frequency $\Delta f$ is within the radio frequency range and equals the RF Bragg cell frequency. The diverging beams leaving the cell are passed through appropriately designed convex lens 6, which converges the beams at cross-over zone 7 at an angle of convergence $\theta$. Within the zone of convergence a pattern of alternating dark and light interference fringes 8, shown out of proportion in FIG. 1, but more clearly defined in FIG. 1A. The fringes move in the direction shown by arrow 9 at a rate equal to $\Delta f$. FIGS. 1 and 1A show the relative positions of the $x$, $y$, and $z$ axes of the various components. It will be seen that the $y$ and $z$ axes lie in the plane of the paper and the $x$ axis lies perpendicular to the paper. The bisector of the two diverging-converging $f_o$ and $f_{o1}$ beams produced by the Bragg cell lie along the $z$ axis; the normal to the fringe planes ($y$ axis) is perpendicular to the converging beam bisector ($z$ axis), the fringe planes are in the $x$-$z$ plane; and the fringes move in the $y$ direction. Filament 10 is positioned and held by means not shown within the fringe zone, preferably at or near its geometric center as shown, so that its longitudinal axis is in the $x$ direction, namely, normal to the bisector of the converging beams $f_o$ and $f_{o1}$ (as well as to the converging beams) namely, parallel to the $x$-$z$ plane of the fringes. As shown schematically, the filament diameter equals the fringe spacing (fringe period) $\lambda_s$ (FIG. 1A) and the fringes move transversely across the filament in the $y$ direction.

The fringe period $\lambda_s$ is determined by the equation:

$$\lambda_s = \frac{\lambda}{2 \sin(\theta/2)}$$

where $\lambda$ is the wavelength of the incident laser beam. It is obvious, therefore, that the size of the fringe period $\lambda_s$ can be varied by varying either or both $\lambda$ and $\theta$. In general, it is easier to vary $\lambda_s$ by adjusting the convergent beam angle $\theta$, as for example by shifting the position of the converging lens in the system shown in FIG. 2, by changing the acoustic frequency of the Bragg cell, or by mechanical movements of additional optical components, or by a combination of the foregoing methods.

Figure 2:
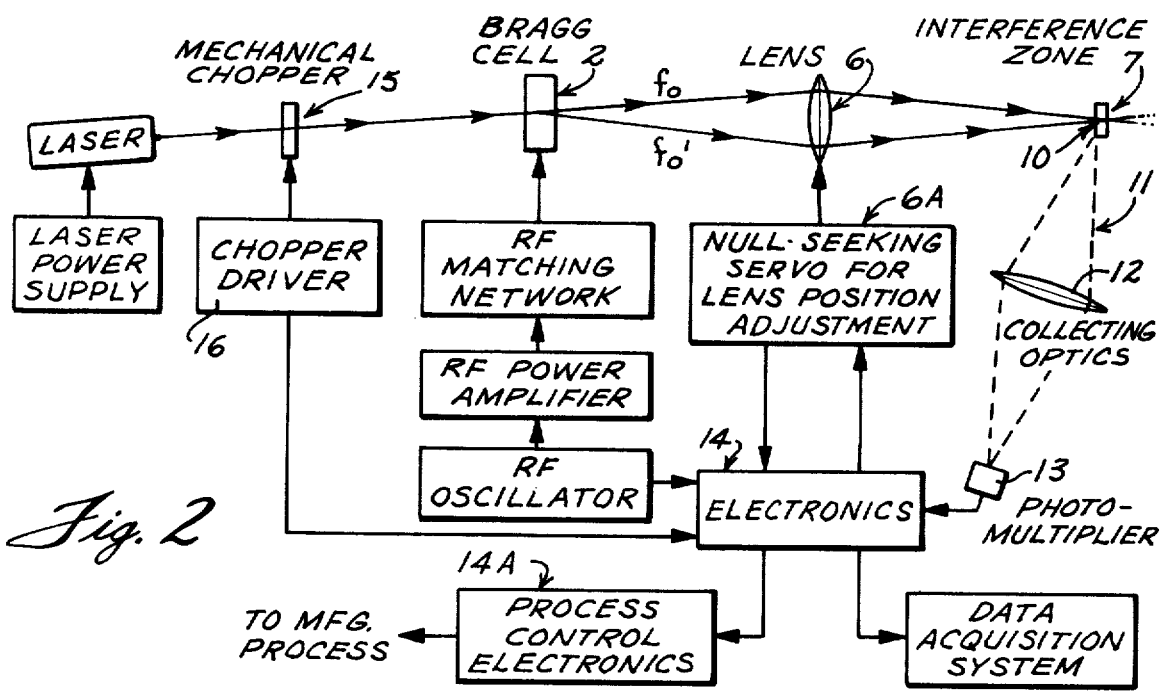
FIG. 2 is a schematic illustration of the embodiment shown in FIG. 1 with associated system components employing "off-axis" detection.
Figure 4:
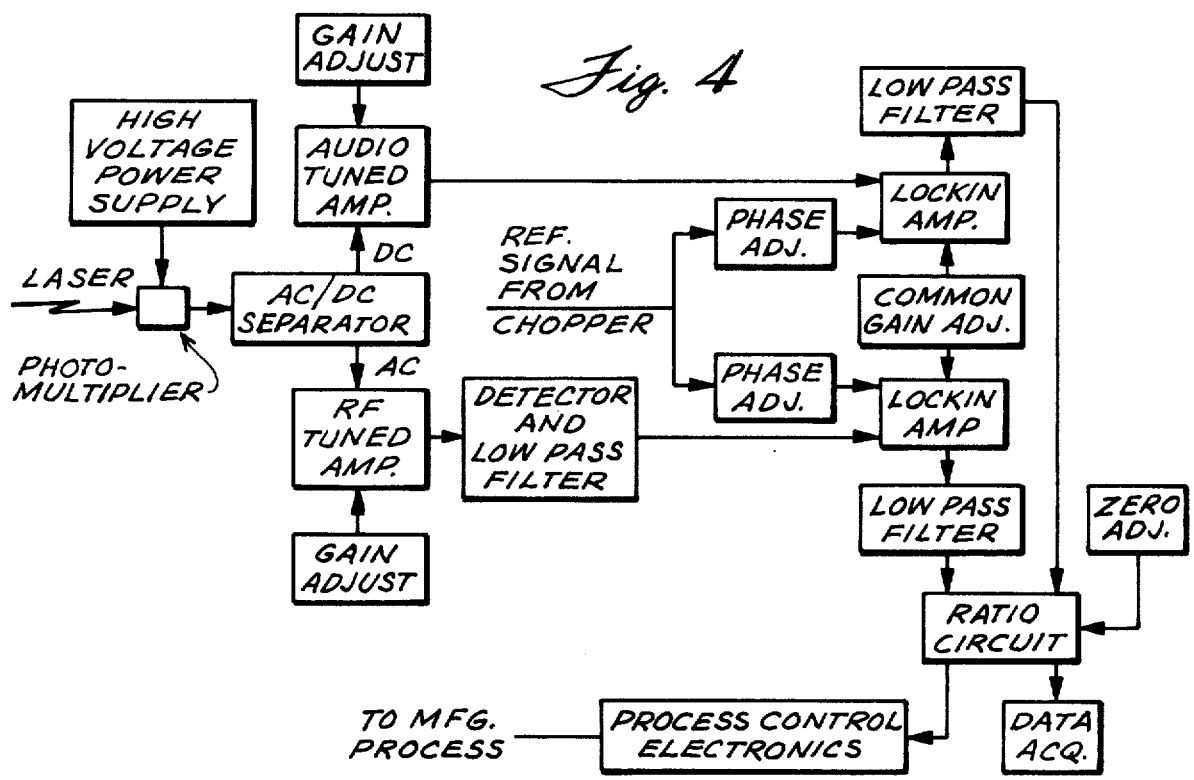
FIG. 4 is a schematic illustration of components which can be used for the "electronics" system of FIGS. 2 or 3.

FIG. 2 illustrates the embodiment shown in FIG. 1 with associated devices for obtaining and utilizing the desired signal. All of the associated optical and electronic components shown in this and in succeeding figures are within the state of the art and, therefore, do not require detailed description. The radiation 11 scattered by filament 10 is collected by lens 12 and converged into photomultiplier 13. From there the signal passes into an electronics system 14, an illustrative type of which is shown in FIG. 4. The electronics system separates the signal into its AC and DC components, amplifies, rectifies, and filters them and then passes them into a ratio circuit which then passes the output into a data acquisition system, such as a chart recorder, meter, other display devices, etc., or relays it into a closed loop process control electronics system 14A which feeds back to a manufacturing process to cause it to eliminate the diameter deviation of the filament being produced if necessary.

Alternatively, the non-zero ratio signal can be fed back to the adjustment system for controlling the angle of beam convergence, for example, by an axial shifting of lens 6 via a null-seeking servo for lens position adjustment until nullity is obtained. The difference in the initial fringe spacing and the corrected fringe spacing can then be fed into the electronics and transmitted to the filament diameter control system of the manufacturing process. Chopper 15 may optionally be inserted between the laser and the Bragg cell, and a reference signal at the chopping frequency, from the chopper driver 16, can be fed into the electronics to allow synchronous detection of the signal. In addition, a reference signal with frequency equal to the RF frequency of the Bragg cell may be used to demodulate the RF component of the total signal. Alternatively, a narrow band amplifier tuned to the RF frequency may be used followed by a conventional demodulator (as shown in FIG. 4).

Figure 3:
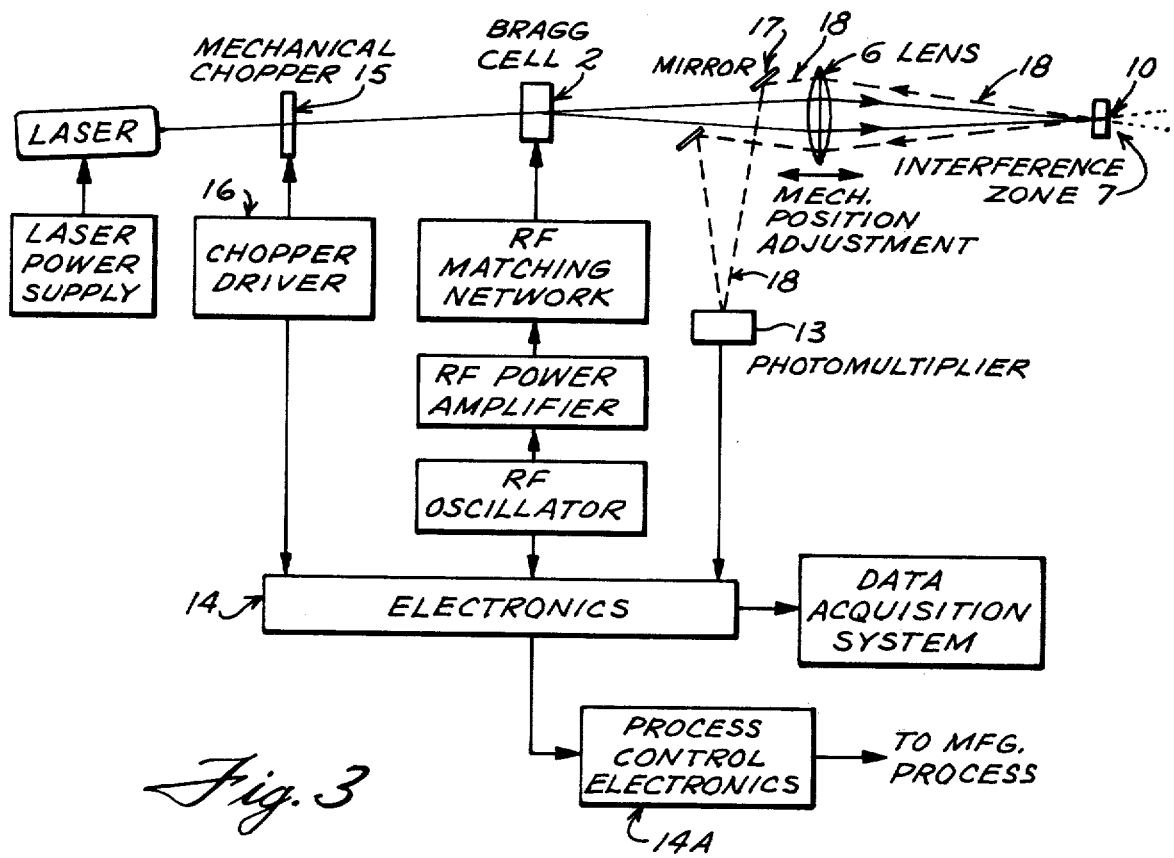
FIG. 3 is a schematic illustration of a modified system employing "on-axis" back scatter detection.

FIG. 3 shows a system generally similar to that of FIG. 2 except that it employs lens 6 and annular mirror 17 to collect the radiation 18 back-scattered by the filament and to focus it onto the photomultiplier 13.

It should be noted that the optical collection system shown in FIGS. 2 and 3 are primarily designs for use with filaments. In the case of slits, the optical collection system will be "on-axis" behind the slit.

FIG. 4 shows schematically an electronics system 14 in detail, which is adequately defined by the legends.

Figure 5:
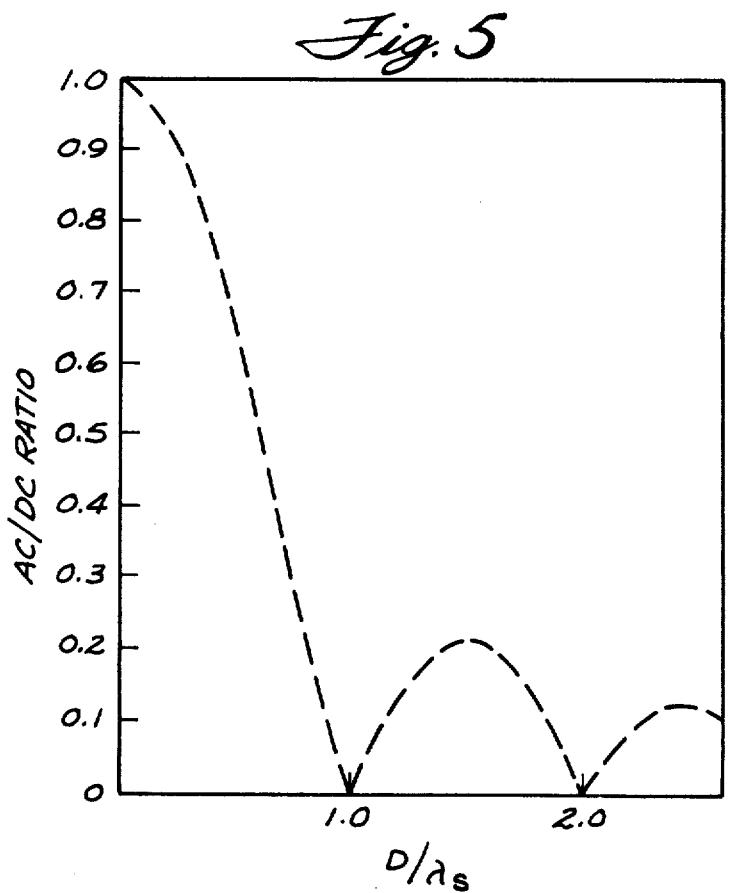
FIG. 5 is a graph showing the relationship of the AC/DC ratio to the filament diameter/fringe period ratio.

It has been noted above that a filament having a diameter which is a whole integer multiple of the fringe period will also produce a null signal. FIG. 5 is a graph which plots the AC/DC ratio versus the D/$\lambda_s$ ratio where D is the diameter of the filament. It will be noted that for each whole integer of D/$\lambda_s$, the AC/DC ratio equals zero but that the successive peaks become progressively shallower, primarily because of increase in the DC radiation component, which is essentially a measure of the total scattered radiation whereas the AC component is the time varying intensity component in the RF range.

Thus, should such a multiple diameter occur, its integer magnitude can be determined, as for example from the corresponding size of the DC component.

EXAMPLE 1

An optical system substantially similar to that shown in FIG. 1 was employed to determine the width of optical slits of 10, 25, and 50 widths. Optical slits were selected rather than filaments because of the known width accuracy of the former. The laser employed was a HeNe laser which produced a laser beam of 6328A wavelength. The laser beam was passed into a Bragg cell operating at 15 Mc modulating frequency. The laser beam was split into two diverging beams of the same intensity, one having the original laser beam wavelength, and the other having a modulated frequency with a differential wavelength ($\Delta\lambda$) of about 0.0002A.

The two beams leaving the Bragg cell were converged by a lens to form a moving fringe pattern in their cross path. The lens could be moved along the y axis to provide for variation in the convergent angle of the beams and, thereby, to vary, as required, the fringe spacing. The optical slits were positioned in the moving fringe zone in the manner above described for the filaments. In all cases, when the fringe spacings were adjusted to equal the width of the optical slits, zero AC/DC ratios were obtained. In spite of the simplicity of the test equipment used, diameter resolution of better than 1 percent was obtained.

The new measuring method can be applied to a relatively wide range of filament or slit dimensions, which has important industrial applications. These dimensions can be measured with presently available optical components transparent to electromagnetic radiation within a range of about $0.2\mu$ to above 1 mm, with the optimum range presently being about $0.5\mu$ to $200\mu$. By using microwaves, the range of measurable width dimensions can be extended to centimeters and even meters.

It will be understood that as heretofore employed in this specification and in the claims, the AC zero signal and resulting AC/DC zero ratio are based on a system which minimizes noise sources of such types as optical, mechanical, and electrical in known manner to the point where they do not apreciably affect the AC signal, or which can be compensated for, for example, by determining the minimum AC/DC value obtained by scanning the fringe period value around the value of a given filament diameter, which can be determined by known means such as optical, mechanical or electronic calibrating means, and compensating by subtracting electronically the obtained minimum from the zero AC/DC ratio as aforedescribed, whereby deviations produced by said noise factors can be determined. Since, as aforedescribed, compensation for deviations produced by said noise factors is obtained by comparison of the obtained minimum with the zero AC/DC ratio for the given filament diameter, it obviously follows that the aforedescribed compensation, by any means, including the aforedescribed electronic subtraction means, in practical terms, can be determined by use of the relationship previously described, namely, that the zero AC/DC ratio (in the case of minimum noise) is produced by a fringe period equivalent to the given filament diameter, namely width/fringe period ratio ($k$) equals one. Thus, the noise deviation can be determined by comparison of the given filament diameter with the fringe period value at the aforedescribed AC/DC signal minimum, in which case the width/fringe period ratio may be different from one and thus may be a constant $k \neq 1$ for the particular element when the measurement is influenced by noise factors. Since, at the minimum AC/DC ratio, the given filament diameter is known, and the fringe period is the factor which may vary, the fringe period at the minimum can be the factor employed for practical determination of variation from the zero AC/DC ratio for the given element width. It should be noted that although the aberrations produced by noise generally result in a finite minimum, it can also, with certain noise conditions, equal zero. In such case, the constant $k$ may or may not equal one, and any compensation required to determine exact width can be accomplished as aforedescribed. The aforementioned compensation for a deviating minimum may be required, for example, by optical noise factors such as those introduced by different degrees of filament opacity, translucency, or transparency; different surface shapes, as aforedescribed, e.g., flat-sided or curved; or different surface conditions, e.g., smooth or rough. As is well-known in the optical art, variations in these factors influence reflection and refraction. In the case of the present invention, therefore, they would influence backscatter by the filaments. Noise factors introduced by slits are generally less severe.

For many applications, initial calibration, namely, width measurement, of the element to be monitored is essential to ensure that the AC/DC minimum obtained at a particular fringe period is an accurate quantitative measure for an element having a required width and/or to determine the amount of compensation required.

In most applications, the above compensation procedure can be dispensed with since the minimum AC/DC ratio characteristic for the element of given width is entirely adequate for monitoring purposes. In such case, deviation from the proper AC/DC minimum can be determined by scanning the fringe period value around the deviating element until the different deviation minimum at a different fringe period is determined and determining the deviation in width by the size difference between the fringe periods at which the correct and deviating minima are obtained. By means of appropriate electronics, such as an error voltage, the degree of deviation can be transmitted to the manufacturing process to initiate correction. In other applications, such as quality control or in manufacturing processes with incremental means for correction, the mere deviation of the minimum may be adequate without further exact determination of the degree of deviation.

In some cases, initial calibration may also be dispensed with, as, for example, where a sample is provided with accompanying accurate size specifications or where a manufacturer merely wishes to ensure accurate duplication of a specific fiber batch without concern as to knowledge of exact width measurement. The latter is frequently true in textile filament manufacturing, where the generally accepted measure is the "denier" that refers primarily to filament weight and only indirectly to filament diameter.

The aforedescribed use of the AC/DC ratio, either in the substantially noiseless zero mode where $D/\lambda_s$ equals a constant of 1, or in the more generalized AC/DC ratio minimum mode, provides the most accurate width-sensing, particularly in cases where the element being monitored (e.g., a plurality of fixed length elements or a continuous element being monitored along its length)

shows substantial change in width or appreciable change in radiation scatter due to appreciable change in optical noise factors either in the cross-sectional dimension or along the length of the element. The accuracy of the AC/DC ratio mode under the aforedescribed conditions is due to the fact that, in the case of a substantial change in width, with accompanying shift in the position of the minimum with regard to fringe period, any change in the DC signal component is substantially proportional to the degree of shift. Since the magnitude of the AC signal also shifts proportionately, the AC/DC ratio minimizes or substantially eliminates error in width-sensing. This is also substantially the case where changes in optical noise factors of the test element are sufficiently small so that they can be averaged out by being "seen" within the visible length of the fringe plane along its x-axis or otherwise are not of such magnitude as to cause a change in the value of the DC signal which is so much larger than the change or shift in the position of the AC or AC/DC minimum as to become substantially non-proportional. So long as the latter does not occur to an appreciable extent, the minimum position of the AC/DC ratio provides an accurate sensing of element width. When the latter disproportionality of the DC signal does occur, width deviation becomes masked by the optical noise and cannot be determined except by recalibration of the element at its position where the large change in optical noise characteristics develops. With or without recalibration, the system can send, e.g., by electronic means, a signal to the manufacturing process informing it that substantial changes in optical characteristics of the element have occurred which may require correction other than width-deviation. Such information can, of course, also be otherwise reported. Such substantial changes in optical characteristics can develop along the length of a manufactured element for a variety of reasons, such as inadequate batch mixing, errors in reagent component concentration in a continuous production process, manufacturing errors in production of slits, and the like.

It will be understood that as employed in the specification and claims, the AC or AC/DC minimum used for width-sensing is based on a DC signal component, any change of which is substantially proportional with respect to any shift or deviation of the minimum position and its corresponding fringe period.

It should also be noted that adjustment of the fringe period to a size producing an AC or AC/DC minimum value, preferably includes continuous scanning of the fringe period across the minimum. A continuous scan or sweep ensures sensing of small deviations of the minimum; shows the direction of such changes; and determines the magnitude, in terms of fringe period, of deviations within the range of the scan. The range of the scan is not critical and can, for example, be in a range of about ± 1–25 percent of element width. For deviations beyond the particular scanning range, the range is shifted to a different range of fringe period. It will be understood that, as employed in the specification and claims, the terms "adjusting" or "adjustment of" of the value of the fringe period to the AC or AC/DC minimum position, including zero, includes continuous scanning of the fringe period value over a range around the minimum, as aforedescribed.

Figure 6:
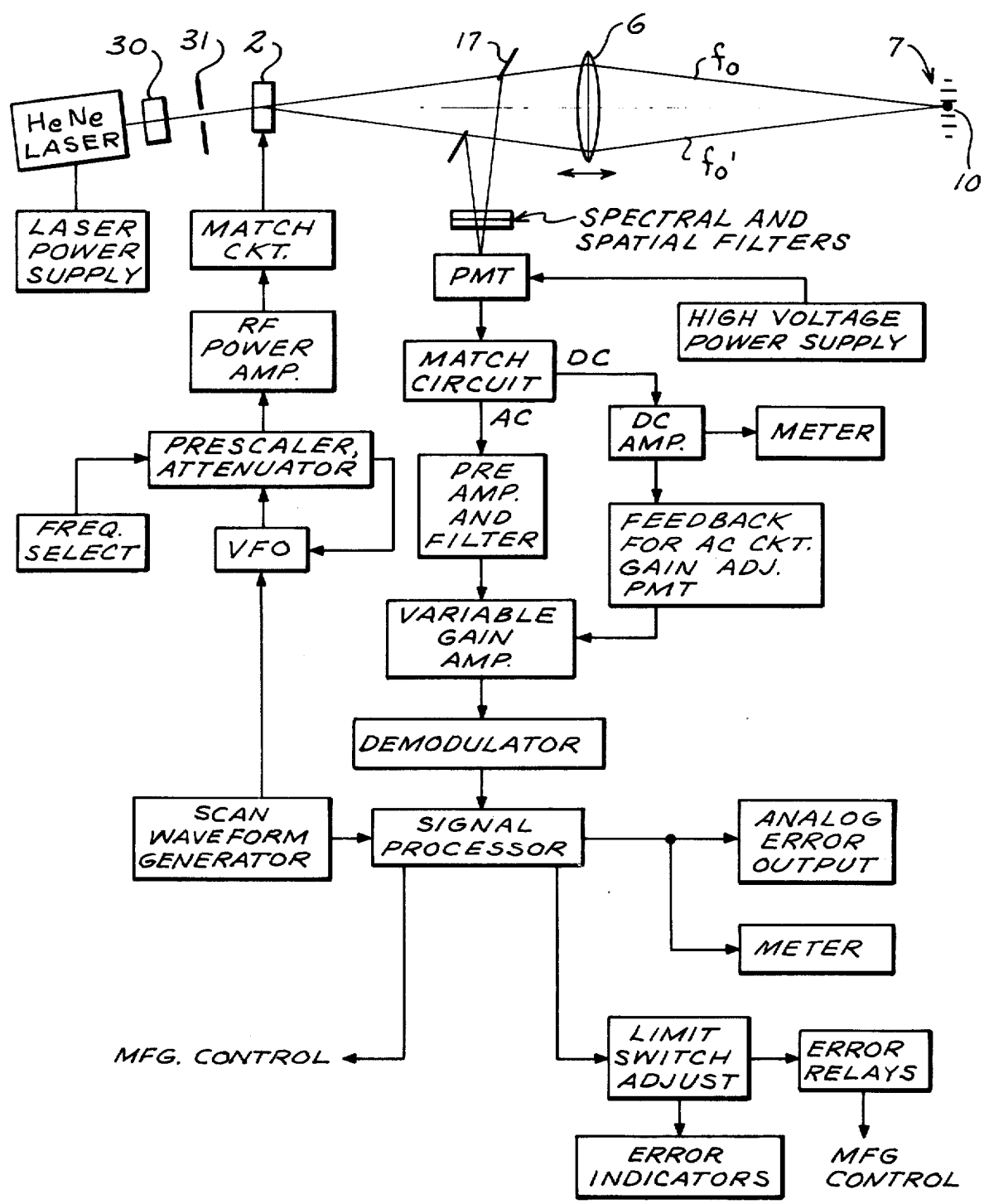
FIG. 6 is a schematic illustration of a modified system wherein only the AC signal component is employed in sensing of element width.

In some applications where changes in the optical noise factors of the element are generally minimal and which permit an appreciable margin of widthsensing error, it may be adequate to determine only the AC signal component minimum for the given element and to compare it with succeeding AC signal minima to determine element-width deviations. In such applications, the DC signal component either does not vary, namely, is a constant, or varies at a rate which results in a width-measurement error within permissible limits, e.g., ± 1 to 10 percent. To ensure that the DC signal component rate of change remains within permissible limits, it may be desirable to include elements in the electronics, such as a DC meter, which provide surveillance of the DC signal component. Since many of the other electronic components in the system are designed to operate linearly within certain limits, it may also be desirable to include electronic components which provide gain adjustments to prevent saturation and shift to non-linear functioning. FIG. 6 shows schematically an electronics system, employing components well-known in the art, which determines element width by means of the AC signal component. The electronic system is adequately defined by the legends.

When employing either the AC or AC/DC signal method, it may be desirable to reduce the effect of small changes in optical hoise along the length of the element on the DC signal component by enlarging the fringe zone in the direction of the filament axis so that the small changes can be "seen" simultaneously and thereby averaged within the length of the fringe plane in the x-direction. If the size of the original laser beam is inadequate to produce the desired dimension of the fringe zone, a beam expander 30, with an optional associated aperture 31 to limit the beam to a portion of more uniform intensity, as shown in FIG. 6, can be positioned downstream of the laser. Such beam expanders are well-known in the optical art. In the present case, expansion of the laser beam and, thereby, expansion in the size of the divided $f_o$ and $f_{o1}$ beam results in a larger fringe zone 7.

As aforedescribed, the fringe period is a function of the wavelength of the laser beam and the angle of convergence $\theta$ of the $f_o$ and $f_{o1}$ beams and can be changed by changing the laser source to one producing a different wavelength or by changing $\theta$ by changing the acoustic frequency of the Bragg cell beam divider or moving converging lens 6 back or forth along the z-axis. The latter means for changing $\theta$ is generally preferred because of the cost of changing the laser source. However, this approach limits the range of angle $\theta$ and thereby limits the use of the particular system to elements within a particular range of width. It has been found that the range of angle $\theta$ can be considerably increased by addition of an optical system downstream of the initial or first beam splitter (e.g., Bragg cell) which is capable of first further diverging the initial diverging pair of $f_o$ and $f_{o1}$ beams and then converging them.

Another refinement in the process and system of the invention which is particularly useful in exacting applications, is the provision of a reference channel which simultaneously produces a fringe pattern preferably identical with the fringe pattern produced in the test element-monitoring channel. Such a reference fringe pattern makes possible constant visibility and monitoring of the fringe period and other characteristics of the fringe pattern, such as illumination intensity and fringe visibility without the light-intensity-distribution-perturbing effect of the presence of the test element. Thus, the reference fringe pattern can provide information for instantaneous determinations of fringe period both for correct and deviating elements, recognition of problems developing in the system, such as an increase in electronic noise or fluctuations in the laser output. It is also possible to insert a standard element positioned in the reference fringe in the same manner as the test element in the test fringe for comparison purposes.

Figure 7:
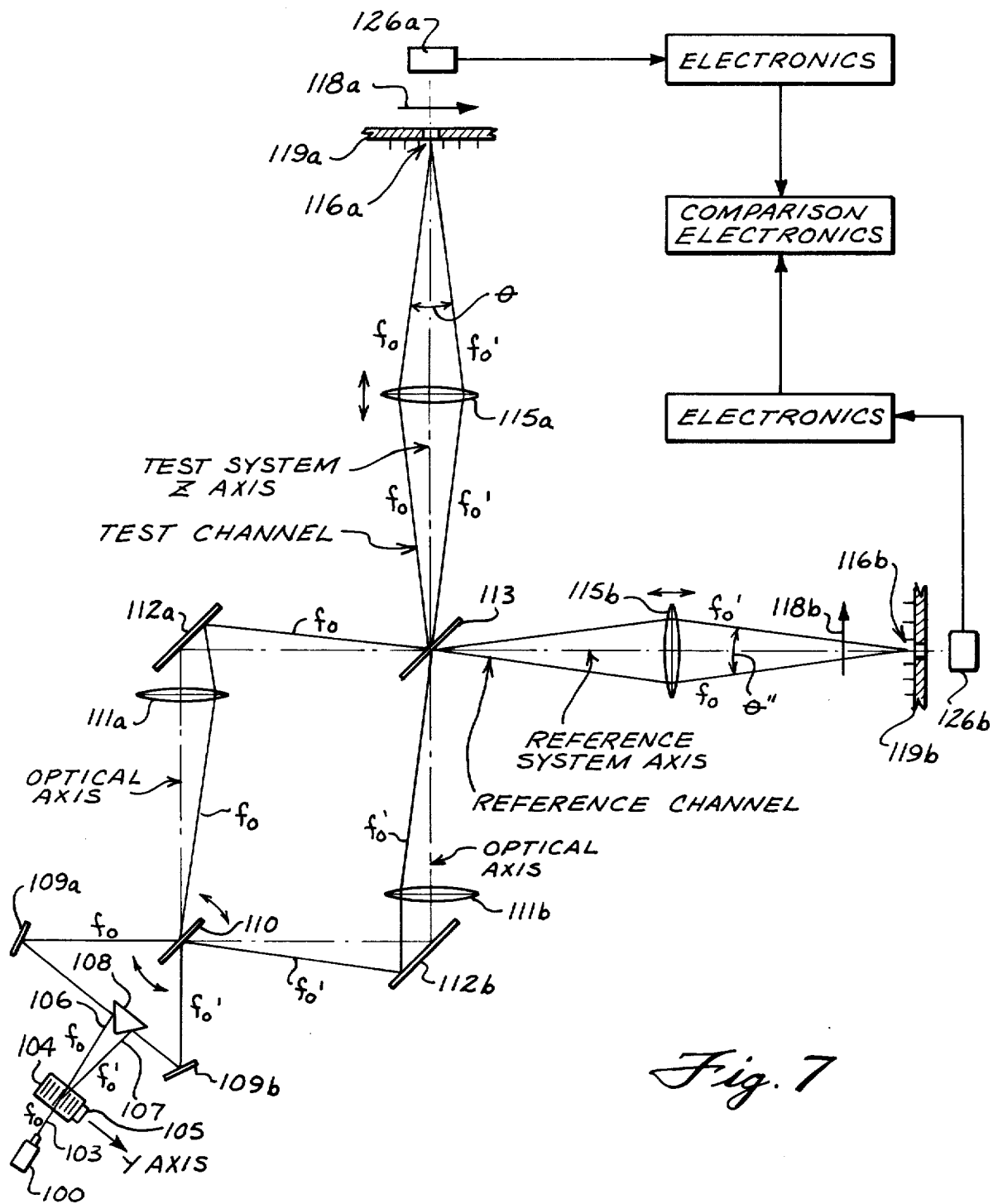
FIG. 7 is a schematic illustration of a modified embodiment of the invention in which the elongated system is a slit.

FIG. 7 shows a system embodiment which illustrates both an optical system for increasing the range of angle $\theta$ and thereby the range of fringe period and a reference channel. Laser 100 emits coherent radiation beam 103 of frequency $f_o$. Beam 103 enters, at a slight angle, Bragg cell 104 which is compressionally driven by crystal transducer 105. The input laser beam is divided into two coherent radiation beams of the same size and intensity, one beam 106 being non-diffracted and having the original $f_o$ frequency, and the other beam 107 being diffracted and acoustically modified into a slightly shifted frequency $f_{o1}$. The diverging $f_o$ and $f_{o1}$ are further symmetrically diverged by conventional optical means, such as rooftop type of front-surface-coated mirror 108, and then symmetrically converged by front-surface mirrors 109a and 109b onto double-sided, front-surface-coated mirror 110, beams $f_o$ and $f_{o1}$ being incident on the opposite mirrored surfaces. Mirror 110 can be rotated around its x-axis through an angle of ± 45°, as shown, to change equally the angle of incidence and reflection of beams $f_o$ and $f_{o1}$, respectively. The illustrated diverged pair of $f_o$ and $f_{o1}$ beams is shown being reflected and transmitted by means of an optical system comprising identical front surface mirrors 112a and 112b and converging lenses 111a and 111b. Identical front-surface mirror pairs 112a and 112converge the $f_o$ and $f_{o1}$ beams onto beam splitter 113 (for purpose of convenience called the second beam splitter), which, by 50% transmission and reflection, divides each beam into two beams of equal size, intensity, and frequency. The two resulting $f_o$ and $f_{o1}$ beam pairs form the test and reference channels, respectively. Convex lenses 115a and 115b converge the test and reference beam pairs to form, at crossover zones, moving fringe patterns 116a and 116b at respective angles $\theta$ and $\theta''$. Preferably $\theta$ and $\theta''$ are equal, although this is not essential since compensating electronics can be used for comparison purposes. Equivalency of $\theta$ and $\theta''$ can be produced by employing identical lenses 115a and 115b and positioning them (including back and forth movement as indicated by the double arrows) at the same distance from beam splitter 113. Rotation of mirror 110 changes angles $\theta$ (and $\theta''$), and, thereby, the fringe period of fringe pattern 116a (and 116b) through a much wider range than is possible with the embodiment shown in FIGS. 1, 2, and 3. Ultimate limitation on the maximum range of $\theta$ (and $\theta''$) is posed by the F number of converging lens 115a (and 115b), or the equivalent F number of other upstream optical components. The fringes of patterns 116a and 116b move in the directions shown by arrows 118a and 118b. Slit element 119a is positioned across the fringe zone 116a as shown, and transmits scattered radiation to detector 126a and associated electronics which determine the AC and DC components and compute the AC signal component or the AC/DC ratios. In the embodiment as shown, a slit standard 119b is positioned in the reference fringe zone and its transmitted radiation is sensed by detector 126b and associated electronics. The test and reference signals are then compared by appropriate conventional electronics.

It should be noted that the embodiment shown in FIG. 7 can be employed in a given application solely with its test channel for its increased range of $\theta$ and fringe period and without use of the reference channel.

EXAMPLE II

An optical system substantially similar to that shown in FIG. 6, was employed to sense the diameter of an elastic rubber filament. The diameter of the filament could be varied (until its breaking point) as desired by changing the applied tension by the filament-holding means. Measurements were made at different fixed diameters from $115\mu$ to $92\mu$, both by calibration and by scanning the fringe period around the calibrated value of the filament and observing the position of the minimum AC value. It was observed that the minimum, at each diameter, was obtained at a $\lambda_s$ value equal to the filament diameter, within the margin of error of the calibration means.

It will be understood that different optical and electronics means known to the art can be employed to practice the invention.

Although this invention has been described with reference to illustrative embodiments thereof, it will be apparent to those skilled in the art that the principles of this invention can be embodied in other forms but within the scope of the claims.

I claim:

1. A process for sensing without contact the width of an elongated element comprising:
   1. producing a pair of coherent electromagnetic radiation beams of substantially the same size and intensity, one of said beams having a different frequency from said other beam, the frequency difference being within the radio frequency range;
   2. converging said beams to form a laterally-moving fringe pattern having a first fringe period within the zone of convergence;
   3. positioning said element within the interference zone, the longitudinal axis of said element being substantially normal to the plane of the convergent beams, said element being substantially spatially stationary relative to said zone, whereby the moving fringe pattern continuously sweeps across said element transversely; and
   4. determining the ratio of the AC to DC components of the resulting radiation as the fringe pattern sweeps across the element;
   5. said process including the step of adjusting the value of the fringe period of said pattern relative to the element width to a fringe period having a size capable of producing a minimum AC/DC ratio, wherein said AC/DC minimum ratio obtained at said fringe period size indicates an element width equal to said fringe period times a constant, or a whole integer multiple of said fringe period plus the fringe period times a constant, said constant being equal to the ratio of the width of said element and said fringe period.

2. The process of claim 1 wherein said fringe period having a size capable of producing a minimum AC/DC ratio is a single fringe period and said integer equals zero.

3. The process of claim 2 wherein said first fringe period is initially adjusted with respect to an element of given width so that the AC/DC minimum at said first fringe period indicates a first different element having said given width and a substantial shift of the AC/DC minimum from said first fringe period indicates a second different element of deviating width.

4. The process of claim 2 wherein the element being measured is a filament.

5. The process of claim 3 wherein the elements being measured are filaments.

6. The process of claim 2 wherein the element being measured is a slit.

7. The process of claim 3 wherein the elements being measured are slits.

8. The process of claim 4 wherein the element is continuously moved along its longitudinal axis.

9. The process of claim 5 wherein the different elements are continuously moved along their longitudinal axes.

10. The process of claim 6 wherein the element is continuously moved along its longitudinal axis.

11. The process of claim 7 wherein the different elements are continuously moved along their longitudinal axes.

12. The process of claim 5 wherein the signal produced by said shift is transmitted to size adjustment controls in a process for manufacturing the element.

13. The process of claim 7 wherein the signal produced by said shift is transmitted to size adjustment controls in a process for manufacturing the element.

14. The process of claim 9 wherein the signal produced by said shift is transmitted to size adjustment controls in a process for manufacturing the element.

15. The process of claim 11 wherein the signal produced by said shift is transmitted to size adjustment controls in a process for manufacturing the element.

16. The process of claim 5 wherein the size of said first fringe period is readjusted to that of a second fringe period which produces a second minimum AC/DC ratio with said second different element of deviating width, whereby the magnitude of width deviation of the element can be determined by the difference in size of said first and second fringe periods.

17. The process of claim 7 wherein the size of said first fringe period is readjusted to that of a second fringe period which produces a second minimum AC/DC ratio with said second different element of deviating width, whereby the magnitude of width deviation of the element can be determined by the difference in size of said first and second fringe periods.

18. The process of claim 9 wherein the size of said first fringe period is readjusted to that of a second fringe period which produces a second minimum AC/DC ratio with said second different element of deviating width, whereby the magnitude of width deviation of the element can be determined by the difference in size of said first and second fringe periods.

19. The process of claim 11 wherein the size of said first fringe period is readjusted to that of a second fringe period which produces a second minimum AC/DC ratio with said second different element of deviating width, whereby the magnitude of width deviation of the element can be determined by the difference in size of said first and second fringe periods.

20. The process of claim 16 wherein the determined magnitude of element width deviation is formed into a signal which is transmitted to size adjustment controls in a process for manufacturing the element.

21. The process of claim 17 wherein the determined magnitude of element width deviation is formed into a signal which is transmitted to size adjustment controls in a process for manufacturing the element.

22. The process of claim 18 wherein the determined magnitude of element width deviation is formed into a signal which is transmitted to size adjustment controls in a process for manufacturing the element.

23. The process of claim 19 wherein the determined magnitude of element width deviation is formed into a signal which is transmitted to size adjustment controls in a process for manufacturing the element.

24. The process of claim 1 wherein said AC/DC minimum ratio is substantially zero and the element width equals the fringe period at said minimum.

25. The process of claim 2 wherein said AC/DC minimum ratio is substantially zero and the element width equals the fringe period at said minimum.

26. The process of claim 3 wherein said AC/DC minimum at said first fringe period equals zero and the first different element width equals the fringe period at said minimum.

27. The process of claim 25 wherein the element being measured is a filament.

28. The process of claim 26 wherein the elements being measured are filaments.

29. The process of claim 25 wherein the element being measured is a slit.

30. The process of claim 26 wherein the elements being measured are slits.

31. The process of claim 27 wherein the element is continuously moved along its longitudinal axis.

32. The process of claim 28 wherein the different elements are continuously moved along their longitudinal axes.

33. The process of claim 29 wherein the element is continuously moved along its longitudinal axis.

34. The process of claim 30 wherein the different elements are continuously moved along their longitudinal axes.

35. The process of claim 28 wherein the signal produced by said shift is transmitted to size adjustment controls in a process for manufacturing the element.

36. The process of claim 30 wherein the signal produced by said shift is transmitted to size adjustment controls in a process for manufacturing the element.

37. The process of claim 32 wherein the signal produced by said shift is transmitted to size adjustment controls in a process for manufacturing the element.

38. The process of claim 34 wherein the signal produced by aid shift is transmitted to size adjustment controls in a process for manufacturing the element.

39. The process of claim 28 wherein the size of said first fringe period is readjusted to that of a second fringe period which produces a second minimum AC/DC ratio with said different element of deviating width, whereby the magnitude of width deviation of the element can be determined by the difference in size of said first and second fringe periods.

40. The process of claim 30 wherein the size of said first fringe period is readjusted to that of a second fringe period which produces a second minimum AC/DC ratio with said different element of deviating width, whereby the magnitude of width deviation of the element can be determined by the difference in size of said first and second fringe periods.

41. The process of claim 32 wherein the size of said first fringe period is readjusted to that of a second fringe period which produces a second minimum AC/DC ratio with said different element of deviating width, whereby the magnitude of width deviation of the element can be determined by the difference in size of said first and second fringe periods.

42. The process of claim 34 wherein the size of said first fringe period is readjusted to that of a second fringe period which produces a second minimum AC/DC ratio with said different element of deviating width, whereby the magnitude of width deviation of the element can be determined by the difference in size of said first and second fringe periods.

43. The process of claim 39 wherein the determined magnitude of element width deviation is formed into a signal which is transmitted to size adjustment controls in a process for manufacturing the element.

44. The process of claim 40 wherein the determined magnitude of element width deviation is formed into a signal which is transmitted to size adjustment controls in a process for manufacturing the element.

45. The process of claim 41 wherein the determined magnitude of element width deviation is formed into a signal which is transmitted to size adjustment controls in a process for manufacturing the element.

46. The process of claim 42 wherein the determined magnitude of element width deviation is formed into a signal which is transmitted to size adjustment controls in a process for manufacturing the element.

47. A process for sensing without contact the width of an elongated element, comprising:
   1. producing a pair of coherent electromagnetic radiation beams of substantially the same size and intensity, one of said beams having a different frequency from said other beam, the frequency difference being within the radio frequency range;
   2. converging said beams to form a laterally-moving fringe pattern having a first fringe period within the zone of convergence;
   3. positioning said element within the interference zone, the longitudinal axis of said element being substantially normal to the plane of the convergent beams, said element being substantially spatially stationary relative to said zone, whereby the moving fringe pattern continuously sweeps across said element transversely; and
   4. determining the AC signal component of the resulting radiation as the fringe pattern sweeps across the element;
   5. said process including the step of adjusting the value of the fringe period of said pattern relative to the element width to a fringe period having a size capable of producing a minimum AC signal, wherein said AC minimum signal obtained at said fringe period size indicates an element width equal to said fringe period times a constant or a whole integer multiple of said fringe period plus the fringe period times a constant, said constant being equal to the ratio of the width of said element and said fringe period;
   6. said process being employed when, during said step of adjusting the fringe period size, the magnitude of the DC component of said resulting radiation varies in an amount from substantially zero to an amount which results in an element width-sensing within a predetermined magnitude of width-sensing error for the given element.

48. The process of claim 47 wherein said fringe period having a size capable of producing a minimum AC signal is a single fringe period and said integer equals zero.

49. The process of claim 48 wherein said first fringe period is initially adjusted with respect to an element of given width so that the AC minimum at said first fringe period indicates a first different element having said given width and a substantial shift of the AC minimum from said first fringe period indicates a second different element of deviating width.

50. The process of claim 48 wherein the element being measured is a filament.

51. The process of claim 49 wherein the different elements being measured are filaments.

52. The process of claim 48 wherein the element being measured is a slit.

53. The process of claim 49 wherein the different elements being measured are slits.

54. The process of claim 50 wherein the element is continuously moved along its longitudinal axis.

55. The process of claim 51 wherein the different elements are continuously moved along their longitudinal axes.

56. The process of claim 52 wherein the element is continuously moved along its longitudinal axis.

57. The process of claim 53 wherein the different elements are continuously moved along their longitudinal axes.

58. The process of claim 51 wherein the signal produced by said shift is transmitted to size adjustment controls in a process for manufacturing the element.

59. The process of claim 53 wherein the signal produced by said shift is transmitted to size adjustment controls in a process for manufacturing the element.

60. The process of claim 55 wherein the signal produced by said shift is transmitted to size adjustment controls in a process for manufacturing the element.

61. The process of claim 57 wherein the signal produced by said shift is transmitted to size adjustment controls in a process for manufacturing the element.

62. The process of claim 51 wherein the size of said first fringe period is readjusted to that of a second fringe period which produces a second minimum AC signal with said second different element of deviating width, whereby the magnitude of width deviation can be determined by the difference in size of said first and second fringe periods.

63. The process of claim 53 wherein the size of said first fringe period is readjusted to that of a second fringe period which produces a second minimum AC signal with said second different element of deviating width, whereby the magnitude of width deviation can be determined by the difference in size of said first and second fringe periods.

64. The process of claim 55 wherein the size of said first fringe period is readjusted to that of a second fringe period which produces a second minimum AC signal with said second different element of deviating width, whereby the magnitude of width deviation can be determined by the difference in size of said first and second fringe periods.

65. The process of claim 57 wherein the size of said first fringe period is readjusted to that of a second fringe period which produces a second minimum AC signal with said second different element of deviating width, whereby the magnitude of width deviation can be determined by the difference in size of said first and second fringe periods.

66. The process of claim 62 wherein the determined magnitude of element width deviation is formed into a signal which is transmitted to size adjustment controls in a process for manufacturing the element.

67. The process of claim 63 wherein the determined magnitude of element width deviation is formed into a signal which is transmitted to size adjustment controls in a process for manufacturing the element.

68. The process of claim 64 wherein the determined magnitude of element width deviation is formed into a signal which is transmited to size adjustment controls in a process for manufacturing the element.

69. The process of claim 65 wherein the determined magnitude of element width deviation is formed into a signal which is transmitted to size adjustment controls in a process for manufacturing the element.

70. The process of claim 47 wherein said AC minimum is substantially zero and the element width equals the fringe period at said minimum.

71. The process of claim 48 wherein said AC minimum is substantially zero and the element width equals the fringe period at said minimum.

72. The process of claim 49 wherein said AC minimum at said first fringe period equals zero and the first different element width equals the fringe period at said minimum.

73. The process of claim 71 wherein the element being measured is a filament.

74. The process of claim 72 wherein the different elements being measured are filaments.

75. The process of claim 71 wherein the element being measured is a slit.

76. The process of claim 72 wherein the different elements being measured are slits.

77. The process of claim 73 wherein the element is continuously moved along its longitudinal axis.

78. The process of claim 74 wherein the different elements are continuously moved along their longitudinal axes.

79. The process of claim 75 wherein the element is continuously moved along its longitudinal axis.

80. The process of claim 76 wherein the different elements are continuously moved along their longitudinal axes.

81. The process of claim 74 wherein the signal produced by said shift is transmitted to size adjustment controls in a process for manufacturing the element.

82. The process of claim 76 wherein the signal produced by said shift is transmitted to size adjustment controls in a process for manufacturing the element.

83. The process of claim 78 wherein the signal produced by said shift is transmitted to size adjustment controls in a process for manufacturing the element.

84. The process of claim 80 wherein the signal produced by said shift is transmitted to size adjustment controls in a process for manufacturing the element.

85. The process of claim 74 wherein the size of said first fringe period is readjusted to that of a second fringe period which produces a second minimum AC signal with said second different element of deviating width, whereby the magnitude of width deviation of the element can be determined by the difference in size of said first and second fringe periods, said process being employed when, during said step of readjusting the fringe period size, the magnitude of the DC component of said resulting radiation varies in an amount from substantially zero to an amount which results in an element width-sensing within a predetermined magnitude of width-sensing error for the given element.

86. The process of claim 76 wherein the size of said first fringe period is readjusted to that of a second fringe period which produces a second minimum AC signal with said second different element of deviating width, whereby the magnitude of width deviation of the element can be determined by the difference in size of said first and second fringe periods, said process being employed when, during said step of readjusting the fringe period size, the magnitude of the DC component of said resulting radiation varies in an amount from substantially zero to an amount which results in an element width-sensing within a predetermined magnitude of width-sensing error for the given element.

87. The process of claim 78 wherein the size of said first fringe period is readjusted to that of a second fringe period which produces a second minimum AC signal with said second different element of deviating width, whereby the magnitude of width deviation of the element can be determined by the difference in size of said first and second fringe periods, said process being employed when, during said step of readjusting the fringe period size, the magnitude of the DC component of said resulting radiation varies in an amount from substantially zero to an amount which results in an element width-sensing within a predetermined magnitude of width-sensing error for the given element.

88. The process of claim 80 wherein the size of said first fringe period is readjusted to that of a second fringe period which produces a second minimum AC signal with said second different element of deviating width, whereby the magnitude of width deviation of the element can be determined by the difference in size of said first and second fringe periods, said process being employed when, during said step of readjusting the fringe period size, the magnitude of the DC component of said resulting radiation varies in an amount from substantially zero to an amount which results in an element width-sensing within a predetermined magnitude of width-sensing error for the given element.

89. The process of claim 85 wherein the determined magnitude of element width deviation is formed into a signal which is transmitted to size adjustment controls in a process for manufacturing the element.

90. The process of claim 86 wherein the determined magnitude of element width deviation is formed into a signal which is transmitted to size adjustment controls in a process for manufacturing the element.

91. The process of claim 87 wherein the determined magnitude of element width deviation is formed into a signal which is transmitted to size adjustment controls in a process for manufacturing the element.

92. The process of claim 88 wherein the determined magnitude of element width deviation is formed into a signal which is transmitted to size adjustment controls in a process for manufacturing the element.

93. The process of claim 1 wherein said laterally moving fringe pattern is formed by:
1. producing said pair of coherent electromagnetic radiation beams;
2. first diverging and then converging said pair of beams onto a rotatable optical means which diverges said pair of beams at an angle determined by the angle of rotation of said rotatable optical means;
3. converging said pair of diverging beams formed by said optical means;
4. dividing said converged pair of beams substantially equally into a first beam pair which forms a test channel and a second beam pair; and
5. converging said first beam pair to form said laterally-moving fringe pattern.

94. The process of claim 2 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

95. The process of claim 3 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

96. The process of claim 16 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

97. The process of claim 47 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

98. The process of claim 48 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

99. The process of claim 49 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

100. The process of claim 62 wherein said laterally moving fringe pattern is formed by:
  1. producing said pair of coherent electromagnetic radiation beams;
  2. first diverging and then converging said pair of beams onto a rotatable optical means which diverges said pair of beams at an angle determined by the angle of rotation of said rotatable optical means;
  3. converging said pair of diverging beams formed by said optical means;
  4. dividing said converged pair of beams substantially equally into a first beam pair which forms a test channel and a second beam pair; and
  5. converging said first beam pair to form said laterally-moving fringe pattern.

101. The process of claim 93 wherein said second beam pair forms a reference channel and is converged to form a second, reference, laterally moving fringe pattern.

102. The process of claim 94 wherein said second beam pair forms a reference channel and is converged to form a second, reference, laterally-moving fringe pattern.

103. The process of claim 95 wherein said second beam pair forms a reference channel and is converged to form a second, reference, laterally-moving fringe pattern.

104. The process of claim 96 wherein said second beam pair forms a reference channel and is converged to form a second, reference, laterally-moving fringe pattern.

105. The process of claim 97 wherein said second beam pair forms a reference channel and is converged to form a second, reference, laterally-moving fringe pattern.

106. The process of claim 98 wherein said second beam pair forms a reference channel and is converged to form a second, reference, laterally moving fringe pattern.

107. The process of claim 99 wherein said second beam pair forms a reference channel and is converged to form a second, reference, laterally moving fringe pattern.

108. The process of claim 100 wherein said second beam pair forms a reference channel and is converged to form a second, reference, laterally moving fringe pattern.

109. A system for measuring without contact the width of an elongated element which comprises:
1. means for producing a pair of coherent electromagnetic radiation beams of substantially the same size and intensity, one of said beams having a different frequency from said other beam, the frequency difference being within the radio frequency range;
2. means for converging said beams to form a laterally-moving fringe pattern having a first fringe period within the zone of convergence;
3. means for positioning said element within said first fringe period in a direction wherein the longitudinal axis of said element is substantially normal to the plane of the convergent beams, and holding it substantially spatially stationary relative to said zone;
4. means for detecting the radiation from said element and separating the detected radiation into AC and DC signal components;
5. means for determining the AC/DC ratio; and
6. adjustment means for adjusting the fringe period of said fringe pattern relative to the element width to a size capable of producing a minimum AC/DC ratio with a given element.

110. The system of claim 109 wherein the element being measured is a filament.

111. The system of claim 109 wherein the element being measured is a slit.

112. The system of claim 110 which includes means for moving the element along its longitudinal axis.

113. The system of claim 111 which includes means for moving the element along its longitudinal axis.

114. The system of claim 110 which includes means for transmitting an AC/DC ratio signal different from said minimum to size adjustment controls in the process for manufacturing the element.

115. The system of claim 111 which includes means for transmitting an AC/DC ratio signal different from said minimum to size adjustment controls in the process for manufacturing the element.

116. The system of claim 112 which includes means for transmitting an AC/DC ratio signal different from said minimum to size adjustment controls in the process for manufacturing the element.

117. The system of claim 113 which includes means for transmitting an AC/DC ratio signal different from said minimum to size adjustment controls in the process for manufacturing the element.

118. The system of claim 110 which includes adjustment means for adjusting the size of the first fringe period to a second fringe period in amount sufficient to shift an initially obtained AC/DC minimum to a different minimum.

119. The system of claim 111 which includes adjustment means for adjusting the size of the first fringe period to a second fringe period in amount sufficient to shift an initially obtained AC/DC minimum to a different minimum.

120. The system of claim 112 which includes adjustment means for adjusting the size of the first fringe period to a second fringe period in amount sufficient to shift an initially obtained AC/DC minimum to a different minimum.

121. The system of claim 113 which includes adjustment means for adjusting the size of the first fringe period to a second fringe period in amount sufficient to shift an initially obtained AC/DC minimum to a different minimum.

122. The system of claim 118 which includes means for determining the magnitude of size deviation of the element from the size difference between the first and second fringe periods.

123. The system of claim 119 which includes means for determining the magnitude of size deviation of the element from the size difference between the first and second fringe periods.

124. The system of claim 120 which includes means for determining the magnitude of size deviation of the element from the size difference between the first and second fringe periods.

125. The system of claim 121 which includes means for determining the magnitude of size deviation of the element from the size difference between the first and second fringe periods.

126. The system of claim 122 which includes means for transmitting the determined magnitude of element size deviation to size adjustment controls in the process for manufacturing the element.

127. The system of claim 123 which includes means for transmitting the determined magnitude of element size deviation to size adjustment controls in the process for manufacturing the element.

128. The system of claim 124 which includes means for transmitting the determined magnitude of element size deviation to size adjustment controls in the process for manufacturing the element.

129. The system of claim 125 which includes means for transmitting the determined magnitude of element size deviation to size adjustment controls in the process for manufacturing the element.

130. A system for measuring without contact the width of an elongated element which comprises:
1. means for producing a pair of coherent electromagnetic radiation beams of substantially the same size and intensity, one of said beams having a different frequency from said other beam, the frequency difference being within the radio frequency range;
2. means for converging said beams to form a laterally-moving fringe pattern having a first fringe period within the zone of convergence;
3. means for positioning said element within said first fringe period in a direction wherein the longitudinal axis of said element is substantially normal to the plane of the convergent beams, and holding it substantially spatially stationary relative to said zone;
4. means for detecting the radiation from said element and separating the AC signal component;
5. means for determining the AC signal; and
6. adjustment means for adjusting the fringe period of said fringe pattern relative to the element width to a size capable of producing a minimum AC signal with a given element.

131. The system of claim 130 wherein the element being measured is a filament.

132. The system of claim 130 wherein the element being measured is a slit.

133. The system of claim 131 which includes means for moving the element along its longitudinal axis.

134. The system of claim 132 which includes means for moving the element along its longitudinal axis.

135. The system of claim 131 which includes means for transmitting an AC signal different from said minimum to size adjustment controls in the process for manufacturing the element.

136. The system of claim 132 which includes means for transmitting an AC signal different from said minimum to size adjustment controls in the process for manufacturing the element.

137. The system of claim 133 which includes means for transmitting an AC signal different from said minimum to size adjustment controls in the process for manufacturing the element.

138. The system of claim 134 which includes means for transmitting an AC signal different from said minimum to size adjustment controls in the process for manufacturing the element.

139. The system of claim 131 which includes adjustment means for adjusting the size of the first fringe period to a second fringe period in amount sufficient to shift an initially obtained AC minimum to a different minimum.

140. The system of claim 132 which includes adjustment means for adjusting the size of the first fringe period to a second fringe period in amount sufficient to shift an initially obtained AC minimum to a different minimum.

141. The system of claim 133 which includes adjustment means for adjusting the size of the first fringe period to a second fringe period in amount sufficient to shift an initially obtained AC minimum to a different minimum.

142. The system of claim 134 which includes adjustment means for adjusting the size of the first fringe period to a second fringe period in amount sufficient to shift an initially obtained AC minimum to a different minimum.

143. The system of claim 139 which includes means for determining the magnitude of size deviation of the element from the size difference between the first and second fringe periods.

144. The system of claim 140 which includes means for determining the magnitude of size deviation of the element from the size difference between the first and second fringe periods.

145. The system of claim 141 which includes means for determining the magnitude of size deviation of the element from the size difference between the first and second fringe periods.

146. The system of claim 142 which includes means for determining the magnitude of size deviation of the element from the size difference between the first and second fringe periods.

147. The system of claim 143 which includes means for transmitting the determined magnitude of element size deviation to size adjustment controls in the process for manufacturing the element.

148. The system of claim 144 which includes means for transmitting the determined magnitude of element size deviation to size adjustment controls in the process for manufacturing the element.

149. The system of claim 145 which includes means for transmitting the determined magnitude of element size deviation to size adjustment controls in the process for manufacturing the element.

150. The system of claim 146 which includes means for transmitting the determined magnitude of element size deviation to size adjustment controls in the process for manufacturing the element.

151. The system of claim 109 wherein said moving fringe pattern is formed by means comprising:
 1. means for producing said pair of coherent electromagnetic radiation beams;
 2. means for first diverging and then converging said pair of beams onto a rotatable optical means adapted to diverge said beams at an angle determined by the angle of rotation of said rotatable optical means;
 3. means for converging said pair of diverging beams formed by said optical means onto a beam splitter adapted to divide said beams substantially equally into a first beam pair adapted to form a test channel and a second beam pair; and
 4. means for converging said first beam pair into said moving-fringe pattern.

152. The system of claim 130 wherein said moving fringe pattern is formed by means comprising:
 1. means for producing said pair of coherent electromagnetic radiation beams;
 2. means for first diverging and then converging said pair of beams onto a rotatable optical means adapted to diverge said beams at an angle determined by the angle of rotation of said rotatable optical means;
 3. means for converging said pair of diverging beams formed by said optical means onto a beam splitter adapted to divide said beams substantially equally into a first beam pair adapted to form a test channel and a second beam pair; and
 4. means for converging said first beam pair into said moving-fringe pattern.

153. The system of claim 151 which includes means for moving the element along its longitudinal axis.

154. The system of claim 152 which includes means for moving the element along its longitudinal axis.

155. The system of claim 151 which includes means for transmitting an AC/DC ratio different from said minimum to size adjustment controls in a process for manufacturing the element.

156. The system of claim 151 which includes means for transmitting an AC minimum different from said minimum to size adjustment controls in a process for manufacturing the element.

157. The system of claim 151 wherein said second beam pair forms a reference channel and the system includes means for converging said second beam pair to form a second, reference, moving-fringe pattern.

158. The system of claim 152 wherein said second beam pair forms a reference channel and the system includes means for converging said second beam pair to form a second, reference, moving-fringe pattern.

159. The system of claim 153 wherein said second beam pair forms a reference channel and the system includes means for converging said second beam pair to form a second, reference, moving-fringe pattern.

160. The system of claim 154 wherein said second beam pair forms a reference channel and the system includes means for converging said second beam pair to form a second, reference, moving-fringe pattern.

* * * * *